United States Patent
Jennings et al.

(10) Patent No.: US 10,164,277 B2
(45) Date of Patent: Dec. 25, 2018

(54) STEAM REFORMER BYPASS LINE AND FLOW CONTROLLER

(71) Applicant: LG Fuel Cell Systems Inc., North Canton, OH (US)

(72) Inventors: Michael Jennings, Derbyshire (GB); Kevin Hufton, Derbyshire (GB)

(73) Assignee: LG FUEL CELL SYSTEMS INC., North Canton, OH (US)

( * ) Notice: Subject to any disclaimer, the term of this patent is extended or adjusted under 35 U.S.C. 154(b) by 255 days.

(21) Appl. No.: 15/333,255

(22) Filed: Oct. 25, 2016

(65) Prior Publication Data

US 2018/0115001 A1    Apr. 26, 2018

(51) Int. Cl.

| | |
|---|---|
| H01M 8/0612 | (2016.01) |
| H01M 8/04007 | (2016.01) |
| H01M 8/04746 | (2016.01) |
| H01M 8/04082 | (2016.01) |
| B01J 7/00 | (2006.01) |
| B01J 19/00 | (2006.01) |
| C01B 3/38 | (2006.01) |
| H01M 8/04089 | (2016.01) |
| H01M 8/0662 | (2016.01) |
| B01J 12/00 | (2006.01) |
| B01J 19/24 | (2006.01) |

(52) U.S. Cl.
CPC ............ *H01M 8/0618* (2013.01); *B01J 7/00* (2013.01); *B01J 12/007* (2013.01); *B01J 19/0013* (2013.01); *B01J 19/248* (2013.01); *C01B 3/384* (2013.01); *H01M 8/04007* (2013.01); *H01M 8/04089* (2013.01); *H01M 8/04201* (2013.01); *H01M 8/04753* (2013.01); *H01M 8/0662* (2013.01); *B01J 2219/00076* (2013.01); *B01J 2219/00087* (2013.01); *B01J 2219/00103* (2013.01); *B01J 2219/00117* (2013.01); *B01J 2219/00164* (2013.01); *B01J 2219/2462* (2013.01); *B01J 2219/2479* (2013.01); *C01B 2203/0233* (2013.01); *C01B 2203/066* (2013.01); *C01B 2203/0838* (2013.01); *C01B 2203/1235* (2013.01)

(58) Field of Classification Search
CPC .......... H01M 8/0637; H01M 8/04007; H01M 8/04014; C01B 2203/066
See application file for complete search history.

(56) References Cited

U.S. PATENT DOCUMENTS

| | | |
|---|---|---|
| 3,462,306 A | 8/1969 | Schneider |
| 4,374,184 A | 2/1983 | Somers et al. |

(Continued)

FOREIGN PATENT DOCUMENTS

| | | |
|---|---|---|
| EP | 673074 B1 | 7/1998 |
| EP | 1617501 A2 | 1/2006 |
| WO | 2011159064 A2 | 12/2011 |

OTHER PUBLICATIONS http://www.hawle.de/en/products/product-detail/?cHash=709da215e7a866ec3bd52ed97db4ee14&productGroupGuid=1ed11559-dd0c-4716-8a9b-52c716f52c93, 2pgs.

*Primary Examiner* — Imran Akram
(74) *Attorney, Agent, or Firm* — Dentons US LLP

(57) ABSTRACT

A reformer unit and high temperature, pressure, or both variable orifice flow controller is provided. The reformer unit may have a reforming section, a heat exchanging section, and a bypass section. The bypass section provides a flow path for the hydrocarbon-containing fuel around the reforming section and has a variable orifice flow controller positioned in the bypassing flow path.

19 Claims, 13 Drawing Sheets

(56) References Cited

U.S. PATENT DOCUMENTS

| | | |
|---|---|---|
| 4,516,606 A | 5/1985 | Worley |
| 5,212,022 A | 5/1993 | Takahashi et al. |
| 7,691,521 B2 | 4/2010 | Ahmed et al. |
| 8,435,683 B2 | 5/2013 | Finnerty et al. |
| 8,449,702 B2 | 5/2013 | Batawi et al. |
| 2001/0009653 A1 | 7/2001 | Clawson et al. |
| 2004/0238038 A1 | 12/2004 | Wark |
| 2005/0170234 A1 | 8/2005 | Liu et al. |
| 2006/0057444 A1 | 3/2006 | Takagi et al. |
| 2007/0154745 A1 | 7/2007 | Penev |
| 2007/0287048 A1 | 12/2007 | Couse et al. |
| 2009/0092883 A1 | 4/2009 | Ozeki et al. |
| 2009/0220413 A1 | 9/2009 | Sumio et al. |
| 2010/0147489 A1 | 6/2010 | White et al. |
| 2011/0039183 A1 | 2/2011 | Armstrong et al. |
| 2011/0159386 A1 | 6/2011 | Kaupert et al. |
| 2012/0058406 A1 | 3/2012 | Lee et al. |
| 2015/0137044 A1 | 5/2015 | Finnerty et al. |
| 2016/0141692 A1 | 5/2016 | Barnard et al. |
| 2016/0149235 A1 | 5/2016 | Carnall et al. |

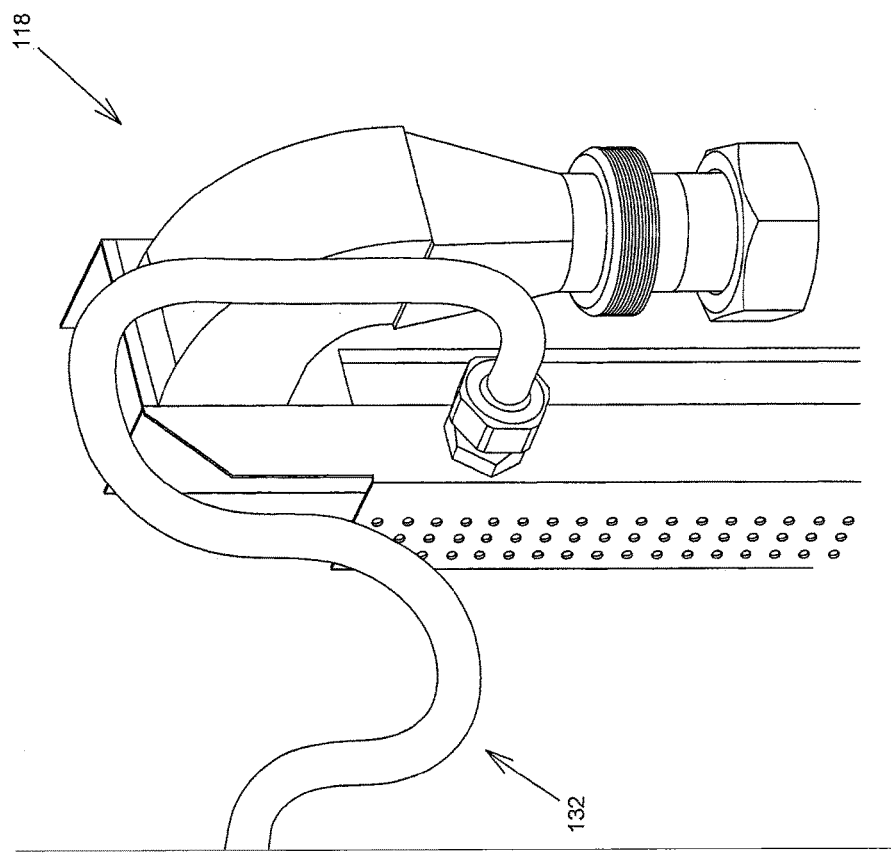

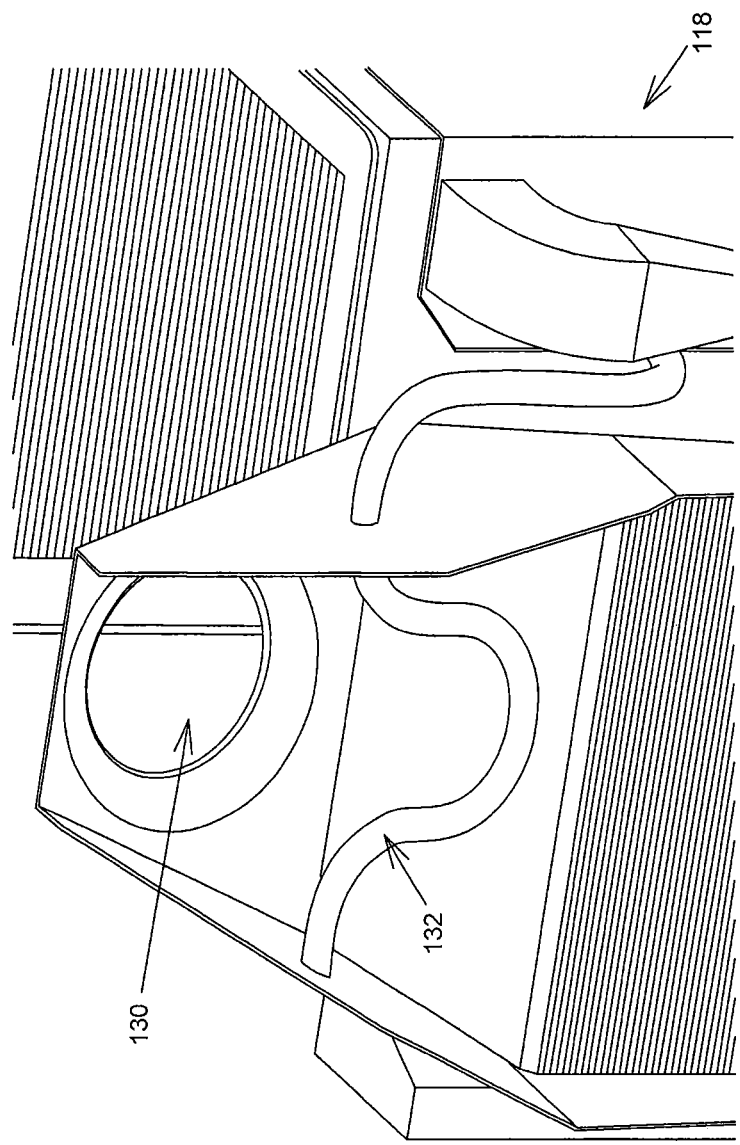

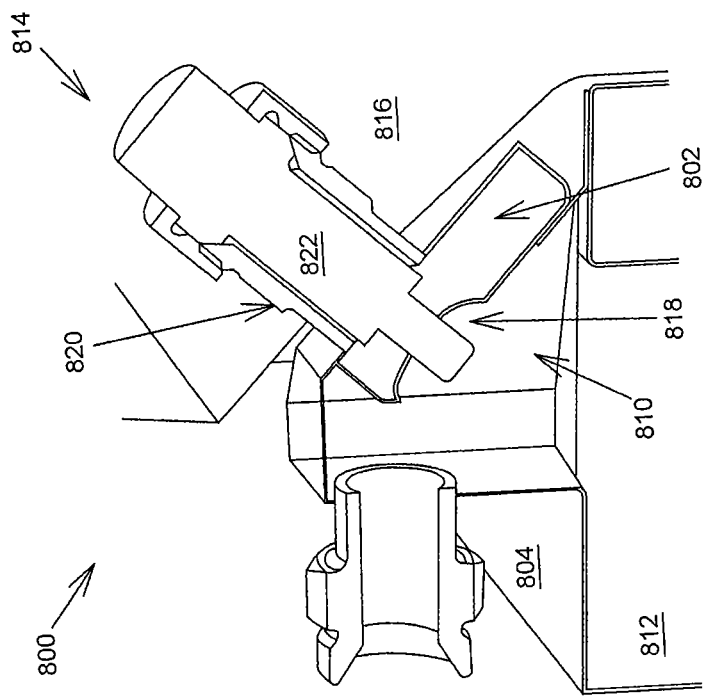
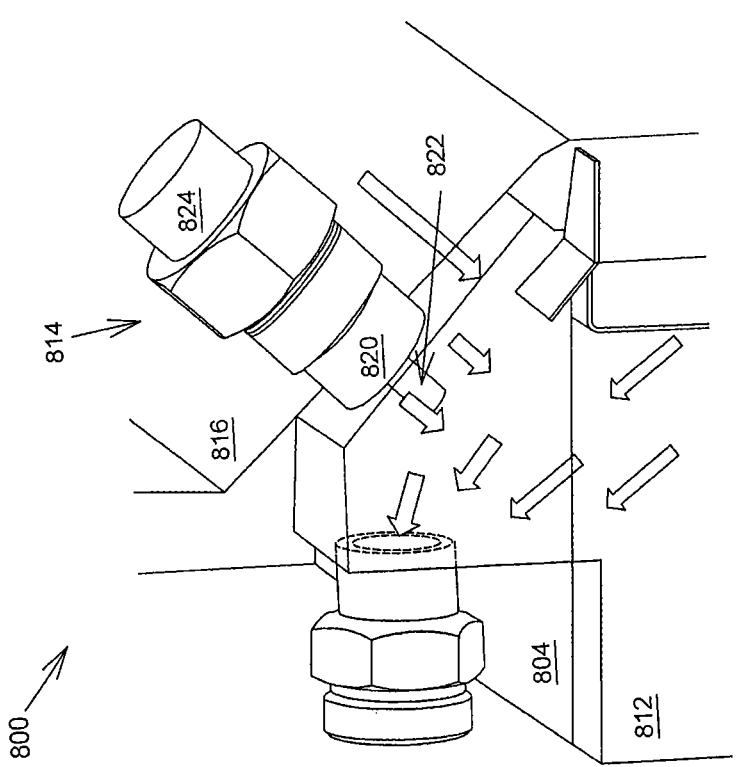
FIG. 12

STEAM REFORMER BYPASS LINE AND FLOW CONTROLLER

FIELD

This disclosure generally relates to fuel cells. More specifically, this disclosure is related to systems and methods which may support internally-reforming fuel cells.

BACKGROUND

A fuel cell is an electrochemical system in which a fuel (such as hydrogen) is reacted with an oxidant (such as oxygen) at high temperature to generate electricity. One type of fuel cell is the solid oxide fuel cell (SOFC). The basic components of a SOFC may include an anode, a cathode, a solid electrolyte, and an interconnect. The fuel may be supplied to the anode, and the oxidant may be supplied to the cathode of the fuel cell. At the cathode, electrons ionize the oxidant. The electrolyte comprises a material that allows the ionized oxidant to pass through to the anode while simultaneously being impervious to the fluid fuel and oxidant. At the anode, the fuel is combined with the ionized oxidant and releases electrons to be conducted back through an external circuit to the cathode. Additional heat, generated in the stack from ohmic losses, is transferred to the cathode stream. This heat can either be used to facilitate other chemical reactions within the system, it can be exhausted from the system, or is radiated to the environment.

A SOFC may be structured, e.g., as a segment-in-series or in-plane series arrangement of individual cells. The oxidant is typically introduced at one end of the series of cells and flows over the remaining cells until reaching the cathode exhaust outlet. Each fuel cell transfers a portion of the ohmic heat into the oxidant thereby raising its temperature, and forming a temperature gradient which increases from the oxidant inlet to the exhaust. Consequently, a temperature gradient may also develop in the fuel cell which increases from the oxidant inlet to the oxidant exhaust. This temperature gradient may cause thermal stresses leading to degradation or failure of the fuel cell components.

The anode of a SOFC may be a mixed cermet comprising nickel and zirconia (such as, e.g., yttria stabilized zirconia (YSZ)) or nickel and ceria (such as, e.g., gadolinia doped ceria (GDC)). Nickel, and other materials, function not only to support the chemical reaction between the fuel and the ionized oxidant but also have catalytic properties which allow the anode to reform a hydrocarbon fuel within the fuel cell. One method of reforming the hydrocarbon fuel is steam reforming of methane ($CH_4$) to form syngas, an endothermic reaction:

$$CH_4 + H_2O \rightarrow CO + 3H_2 \Delta H° = 206.2 \text{ kJ/mole}$$

The heat necessary for the reformation of methane could be supplied directly from the ohmic heat generated within the fuel cell stack. This direct heat transfer would help cool the stack, reduce thermal stresses, and enable more of the fuel cell stack to operate at the optimal operating temperature for the fuel cells. However, in-stack reforming introduces several technical challenges. Unreformed methane must be supplied in the correct amount to avoid excessively cooling of the fuel cell and in the correct manner to avoid localized cooling. Additionally, under the right conditions, hydrocarbon fuels have a propensity to form carbon, for example via thermal cracking:

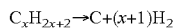

$$C_xH_{2x+2} \rightarrow C + (x+1)H_2$$

Carbon formation can cause fouling and degradation of fuel cell components through anode delamination, metal dusting and other failure mechanisms.

Consequently, supplying a mixture of a syngas reformed external to the fuel cell and an unreformed fuel to the anode may provide better a balance of system performance and durability than supplying either reformate or unreformed fuel alone. However, the ratio of reformed and unreformed fuel must be precisely controlled. If the ratio is too high, the large temperature gradient across the fuel stack will remain. If it is too low, carbon formation will compromise fuel cell performance and life.

Additionally, assemblies for controlling the flow rate a fluid typically include needle or other types of valves and orifice plates. Some adjustable orifice plates comprise rotating plates wherein each plate defines an opening. The alignment of plate openings determines the effective flow area of the orifice. However, these solutions are not suitable for the high temperature and pressure conditions of an operating fuel cell and are prone to leakage.

There remains a need for precise control of the ratio of reformed and unreformed fuels delivered to a fuel cell stack to ensure that the proper amount of reforming occurs internally to the fuel cell. Additionally, there remains a need for systems and methods to achieve this precise control.

In accordance with some embodiments of the present disclosure, a reformer with a bypass is provided. The bypass may contain a flow controller that restricts the bypass flow. The flow controller may be adjustable to control the flow rate of the fluid through the bypass, thereby enabling precise control of the ratio of reformate and unreformed fuels supplied to the fuel cell stack. This design permits some of the disclosed embodiments to accommodate a wide range of in-stack reforming fuel cell designs and minimizes the risk for carbon formation.

In accordance with some embodiments of the present disclosure, effective and adjustable means are provided that control the fluid flow rate within a reformer bypass in a high temperature and pressure environment.

In accordance with some embodiments of the present disclosure, a reformer unit is provided. The reformer unit may have a reforming section, a heat exchanging section, and a bypass section. The reforming section may reform a hydrocarbon-containing fuel, and have an inlet in fluid communication with a source of hydrocarbon fuel and an outlet in fluid communication with an anode inlet of a fuel cell stack. The heat exchanging section may heat a fluid flowing in the reforming section, in the bypass section, or both, and may have an inlet in fluid communication with an exhaust of a cathode of a fuel cell stack, and an outlet adapted for fluid communication with an inlet of a cathode of a fuel cell stack. The heat exchanging section is in thermal communication with said reforming section (or said bypass section or both) to effect heat transfer between the fluids flowing in each section. The bypass section provides a flow path for the hydrocarbon-containing fuel around the reforming section, and has an inlet in fluid communication with the reforming section inlet, an outlet in fluid communication with the reforming section outlet, and a variable orifice flow controller positioned in the bypassing flow path.

In accordance with some embodiments of the present disclosure, a variable orifice flow controller for controlling the flow of a high temperature, high pressure, or both fluid is provided. The flow controller may comprise an upstream connector, a downstream connector and an interconnector. The upstream connector may have cylindrical tubular portion defining a conduit in fluid communication with a flow path of high temperature fluid and a frusto-conical portion defining a plurality of conduits in fluid communication with the conduit. The downstream connector may define a frusto-conical cavity for receiving the frusto-conical portion of said upstream connector and a plurality of conduits in fluid communication with said cavity. The interconnector may provide a fluid-tight connection when the frusto-conical portion of the upstream connector is received within the cavity defined by said downstream connector. The amount of fluid communication between the plurality of conduits defined by the downstream and upstream connectors is selected by the radial alignment between the upstream and downstream connectors when in a gastight connection.

In accordance with some embodiments of the present disclosure a variable orifice flow controller for controlling the flow of a high temperature, high pressure, or both gas is provided. The flow controller may comprise an upstream connector, a downstream connector, a disc, and an interconnector. The upstream connector may have cylindrical tubular portion defining a conduit in fluid communication with a flow path of high temperature fluid and a frusto-conical portion defining a plurality of conduits in fluid communication with the conduit. The downstream connector may define a frusto-conical cavity for receiving the frusto-conical portion of said upstream connector and a conduit in fluid communication with the cavity. The disc may define a plurality of conduits and may be adjacent to a face of the frusto-conical portion of said upstream connector in a selected radial alignment such that the plurality of conduits defined by the disc are in fluid communication with the plurality of conduits defined by the frusto-conical portion of the upstream connector and the conduit define by the downstream connector. The interconnector may provide a fluid-tight connection when the frusto-conical portion of the upstream connector is received within the cavity defined by said downstream connector. The amount of fluid communication between the plurality of conduits define by the disc and the plurality of conduits defined by the frusto-conical portion of said upstream connector is selected by the radial alignment of the conduits when in a gastight connection.

In accordance with some embodiments of the present disclosure, a reformer unit for a fuel cell is presented. The reformer unit may comprise a reforming section, a heat exchanging section, and a bypass plenum. The reforming section reforms a hydrocarbon-containing fuel and has an inlet in fluid communication with a source of hydrocarbon-containing fuel and an outlet plenum in fluid communication with an anode inlet of a fuel cell stack. The heat exchanging section heats a fluid flowing in the reforming section, the bypass plenum, or both. The heat exchanging section has an inlet in fluid communication with the exhaust of a cathode and an outlet adapted for fluid communication with an inlet of cathode of the fuel cell stack. The heat exchanging section is in thermal communication with the reforming section and the bypass plenum to effect a heat transfer. The bypass plenum provides a flow path for the hydrocarbon-containing fuel to bypass the reforming section and has an inlet in fluid communication with the reforming section inlet, an outlet in fluid communication with the reforming section outlet plenum and a flow restrictor in the flowpath between the outlet of the bypass plenum and the outlet plenum of the reforming section.

In accordance with some embodiments of the present disclosure, a flow restrictor for restricting the flow of a high temperature fluid through an orifice providing fluid communication between two plenums is provided. The flow restrictor may comprise a connector mounted to a wall of a first plenum, a fitting, an elongated flow restricting member, and an internally threaded sealing nut. The connector comprises a first portion defining a cylindrical cavity having a threaded portion and a second portion which defines a frusto-cylindrical cavity in communication with the cylindrical cavity. The fitting comprises a frusto-conical end portion that is positioned within the frusto-conical cavity and defines an axial slot. The elongated flow restricting member comprises a cylindrical threaded portion positioned and threadably engaged with the cylindrical cavity, a portion extending from one end of said cylindrical portion into the axial slot and a tapered portion extending from the other end of the cylindrical portion through the orifice. The axial alignment of the tapered portion and the orifice is selectable by rotating the flow restricting member relative to the connector. The internally threaded sealing nut engages an external threaded portion of the connector and provides a fluid-tight seal between the fitting and the connector.

In accordance with some embodiments of the present disclosure, a reforming unit for a fuel cell system is provided. The reforming unit may comprise a reforming section, a heat exchanging section and a bypass plenum. The reforming section reforms a hydrocarbon containing fuel. The heat exchanging section effects a heat transfer between a fluid flowing therethrough and the fluid flowing through the reforming section, the bypass plenum, or both. The bypass plenum provides a flowpath for the hydrocarbon-containing fuel to bypass the reforming section. The bypass plenum may comprise a flow restrictor in the outlet of the bypass plenum to control the amount of fluid communication between the outlet of the bypass plenum and the outlet of the reforming section.

These and many other advantages of the present subject matter will be readily apparent to one skilled in the art to which the disclosure pertains from a perusal of the claims, the appended drawings, and the following detail description of the embodiments.

BRIEF DESCRIPTION OF THE DRAWINGS

FIGS. 2A and 2B are perspective views of a reformer having a bypass in accordance with some embodiments of the present disclosure.

FIG. 12 provides a close-up view and a cross-sectional view of the outlet of a bypass plenum in accordance with some embodiments of the present disclosure.

Figure 1:
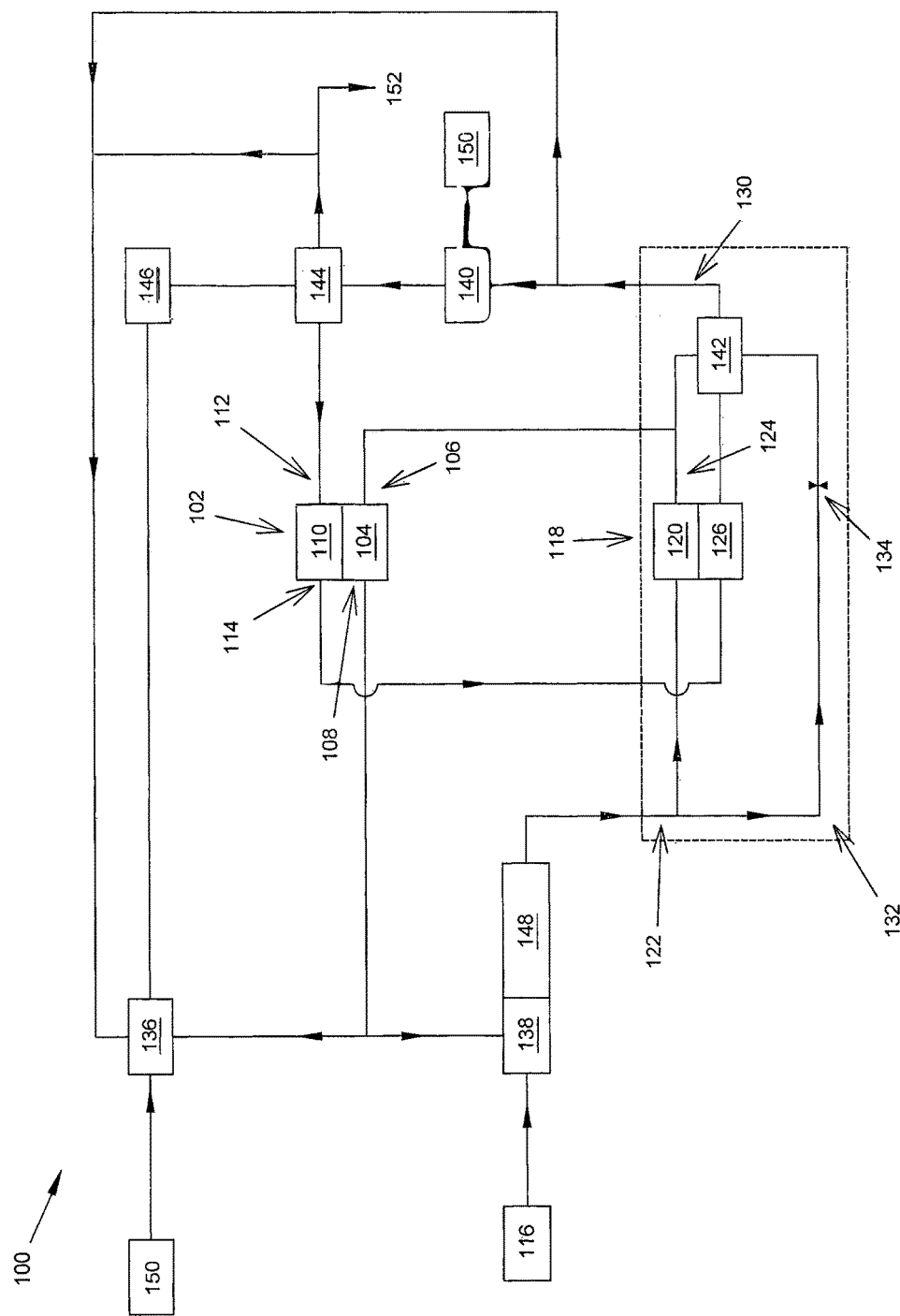
FIG. 1 is a system diagram of a fuel cell system with a reformer having a bypass in accordance with, some embodiments of the present disclosure.

Referring to the drawings, some aspects of non-limiting examples of a fuel cell system in accordance with an embodiment of the present disclosure are schematically depicted. In the drawings, various features, components and interrelationships therebetween of aspects of an embodiment of the present disclosure are depicted. However, the present disclosure is not limited to the particular embodiments presented and the components, features and interrelationships therebetween as are illustrated in the drawings and described herein.

DETAILED DESCRIPTION

The objectives and advantages of the claimed subject matter will become apparent from the following detailed description of the preferred embodiments thereof in connection with the accompanying drawings, in which like reference numerals denote like elements.

A system diagram of a fuel cell system 100 configured for internal reforming of a hydrocarbon fuel having a bypass in accordance with some embodiments of the present disclosure is illustrated in FIG. 1. The system 100 comprises a fuel cell stack 102, a source of hydrocarbon fuel 116, a reformer unit 118, and an oxidant source 150. The fuel cell stack 102 comprises an anode portion 104 in fluid communication with an anode inlet 106 and an anode exhaust 108, and a cathode portion 110 in fluid communication with a cathode inlet 112 and a cathode exhaust 114. The fuel cell stack 102 may be of any fuel cell design and is preferably a SOFC.

The source of hydrocarbon fuel 116 may provide any type of hydrocarbon fuel, such as, e.g., methane, to the fuel cell system 100. The source of oxidant 150 may provide air or other oxidant to the fuel cell system 100.

The reformer unit 118 converts hydrocarbon fuel from the source of hydrocarbon fuel 116 into a reformate and comprises one or more cold-side channels 120, a fuel supply conduit 122, a reformate exhaust conduit 124, one or more hot-side channels 126, a cathode exhaust conduit 128, a cathode inlet conduit 130, one or more bypass channels 132, and a flow controller 134. In a preferred embodiment the reformer unit 118 is a steam reformer.

The cold-side channels 120 provide reforming passages that reform the fuel supplied from the source of hydrocarbon fuel 116 into a reformate. The cold-side channels 120 may be referred to as a reforming section. The reforming passages may contain a catalyst comprising at least one Group VIII metal, and preferably one Group VIII noble metal, such as, e.g., platinum, palladium, rhodium, iridium or a combination thereof. A catalyst comprising rhodium and platinum are preferred. The catalyst may contain active metals in any suitable amount that achieves the desired amount of hydrocarbon conversion. For example, the active catalyst metals may comprise 0.1 to 40 wt % of the catalyst. In some embodiments, the active catalyst metals may comprise 0.5 to 25 wt % of the catalyst. In some embodiments, the active catalyst metals may comprise 0.5 to 15 wt % of the catalyst.

In some embodiments, the catalyst may contain one or more promoter elements to improve the catalyst activity, durability, suppress carbon formation, or any combination of these or other improvements. The promoter elements may include, but are not limited to, elements from Groups IIa-VIIa, Groups Ib-Vb, lanthanide and actinide series elements, or any combination thereof. Promoters such as magnesia, ceria, and baria may suppress carbon formation. The promoter elements may be present in any amount ranging from 0.01 to 10 wt % of the catalyst. In some embodiments, the promoter elements may be present in amount ranging from 0.01 to 5 wt % of the catalyst. The embodiments of the present disclosure are not so limited and may contain any amount of active metal, promoter elements, or both in ranges outside of those expressly listed.

The catalyst may be supported on a carrier comprising a refractory oxide such as, e.g., silica, alumina, titania, zirconia, tungsten oxides, and mixtures thereof, although the disclosure is not limited to refractory oxides. In some embodiments, the carrier may comprise a mixed refractory oxide compound comprising at least two cations. The catalyst active and promoter elements may be deposited on the carrier by any of a number of techniques. The catalyst may be deposited by impregnation onto the carrier, e.g., by contacting the carrier materials with a solution of the catalyst followed by drying and calcining the structure. The catalyst may be coated onto the plates of a heat exchanger or on inserts placed into the cold-side channels 120. Catalyst pellets of a suitable size and shape may also be placed in the cold-side channel 120. However, the embodiments of the present disclosure are not so limited, and any means of incorporating the catalyst into the cold-side channels 120 may be used, such as, e.g., using a porous support structure.

The cold-side channels 120 are in fluid communication with the source of hydrocarbon fuel 116 via a fuel supply conduit 122 that functions to transport the hydrocarbon fuel from the source of the hydrocarbon fuel 116 to the cold-side channels 120 of the reformer unit 118.

In accordance with some embodiments, the fuel cell system 100 may further comprise a higher hydrocarbon reduction unit 148 which is in fluid communication with both the source of hydrocarbon fuel 116 and the fuel supply conduit 122. The higher hydrocarbon reduction unit 148 may be used upstream of the reformer unit 118 to reduce the level of higher hydrocarbons fed to the reformer unit 118 cold-side channels 120 and the bypass channel 132. By reducing the level of higher hydrocarbons fed to the reformer unit 118, the higher hydrocarbon reduction unit 148 inhibits carbon formation within the fuel cell system 100.

As the hydrocarbon fuel passes through the reforming passages of the cold-side channels 120 it is at least partially reformed in a reformate or syngas (such as, e.g., hydrogen, or hydrogen and carbon monoxide). This reformate flows into the reformate exhaust conduit 124, which may also be referred to as an outlet plenum, that is in fluid communication with both the cold-side channels 120 and the anode inlet 106. Prior to reaching the anode inlet 106, the reformate in the reformate exhaust conduit 124 may reach a junction at which the reformate may be combined and mixed with the flow of an unreformed hydrocarbon fuel flowing through the bypass channel 132. The unreformed hydrocarbon fuel flowing through the bypass channel 132 may flow through a heat exchanger 142, which may be referred to a second heat exchanging section. Heat exchanger 142 transfers heat from the cathode exhaust into the unreformed fuel. In some embodiments, the heat exchanger 142 may be located upstream from the hot-side channels 126 rather than downstream as depicted in FIG. 1. In some embodiments, the hot fluid flowing through heat exchanger 142 may be some fluid other than the cathode exhaust, such as, e.g., the anode exhaust, gasses from a anode-exhaust recycling combustor (such as combustor 146), or other source.

Reformer Unit 118 also comprises one or more hot-side channels 126, which may referred to as a heat exchange section. The hot-side channels 126 provide a passage for a cathode exhaust gas to flow through the reforming unit 118. These channels 126 may be arranged in a sufficiently close proximity and orientation to the cold-side channels 120 in order to effect the transfer of heat between fluids flowing in the hot-side channels 126 and the cold-side channels 120. The fluid flowing in these channels maybe oriented for parallel flow, counter flow, cross flow, or any other heat exchanger configuration. Regardless of the proximity of the heat exchange section to the reforming section, both components are arranged to be in thermal communication with one another.

The hot-side channels 126 of reformer unit 118 are in fluid communication with the cathode exhaust 114 via the cathode exhaust conduit 128. Additionally, the hot-side channels 126 may be in fluid communication with the cathode inlet 112 via the cathode inlet conduit 130. In accordance with some embodiments, the cathode exhaust in the cathode inlet conduit 130 is supplied to the suction side of a cathode ejector 140. The oxidant source 150 may provide the motive energy which operates the cathode ejector 140. The cathode exhaust and oxidant may flow through the cold-side channels of a heat exchanger 144 prior to being supplied to the cathode inlet 112. The hot-side channels of heat exchanger 144 may provide passage ways for a combustor 146 exhaust gas flow or other hot fluid which transfers heat into the combined cathode exhaust-oxidant flow supplied to the cathode inlet 112.

The reformer unit 118 comprises one or more bypass channels 132, which may be referred to as a bypass section for providing a bypassing flow path, that provide a non-reforming passage for hydrocarbon fuel to flow through the reformer unit 118. The bypass channel 132 is in fluid communication with the fuel supply conduit 122 and the reformate exhaust conduit 124. The unreformed hydrocarbon fuel from the bypass channel 132 may be combined and mixed with the reformed fuel flowing through the reformate exhaust conduit 124. The bypass channel 132 may be a line comprising a ceramic coating in order to inhibit metal-catalyzed carbon formation.

In accordance with some embodiments of the present disclosure, perspective views of a reformer having a bypass are illustrated in FIG. 2A and FIG. 2B. A portion of the reformer unit 118 is illustrated as having a bypass channel 132. The bypass channel 132 may be a line (such as, e.g., piping, hose, or similar component) connected proximate to and in fluid communication with the fuel supply conduit 122. As shown in FIG. 2B, the bypass channel 132 line may pass through the cathode inlet conduit 130 prior to merging with the reformate exhaust conduit 124. The cathode inlet conduit 130 may also be considered an exhaust duct through which the cathode exhaust is removed from the reforming unit 118. In some embodiments, the passage of the bypass channel 132 line through the cathode inlet conduit 130 will effect a heat transfer between the two fluids flowing in their respective sections. This arrangement may provide the function of heat exchanger 142, although the embodiments of the present disclosure are not so limited. The amount heat transferred between the cathode exhaust in the cathode inlet conduit 130 and the unreformed fuel in the bypass, channel 132 may be effected by varying the length of the bypass channel 132 line in the cathode inlet conduit 130.

In some embodiments, the one or more bypass channel 132 may be integrated with the structure of the cold-side channels 120 and the hot-side channels 126 such that the channels 132 are in sufficient proximity to the hot-side channel 126 effect a heat transfer. In some embodiments, the one or more bypass channels 132 may be the equivalent of an un-catalyzed cold-side channels 120.

The reformer unit 118 may further comprise a flow controller 134, which may be referred to as a variable orifice flow controller, in the bypass channel 132. The flow controller 134 may be an interchangeable flow orifice. The flow controller restricts the flow of the unreformed hydrocarbon fuel by reducing the effective area of the bypass channel 132. Controlling the flow rate of the unreformed hydrocarbon fuel flowing in the bypass channel 132 allows the precise control of the ratio of reformate to unreformed fuel mixture supplied to the anode 104.

In accordance with some embodiments of the present disclosure, the fuel cell system 100 may further comprise one or more anode exhaust recycle lines. For example, a portion of the anode exhaust may be drawn into an anode ejector 138. The motive force for the anode ejector 138 may be the source of hydrocarbon fuel 116, which may be pressurized by any conventional means. The recycled anode exhaust may then be combined with the source of hydrocarbon fuel 116 supplied to the reformer unit 118.

Another portion of the anode exhaust may be drawn into an auxiliary ejector 136. The auxiliary ejector 136 may be supplied by the oxidant source 150. The combined oxidant-anode exhaust mixture may then flow to a combustor 146 that supplies a combustion product to the hot-side channels of heat exchanger 144. This combustion product may then be vented to the environment at 152. Other systems may be supplied with these combustion products or other portions of the anode exhaust, e.g., to power a turbine which may pressure various flows in the fuel cell.

Figure 3:
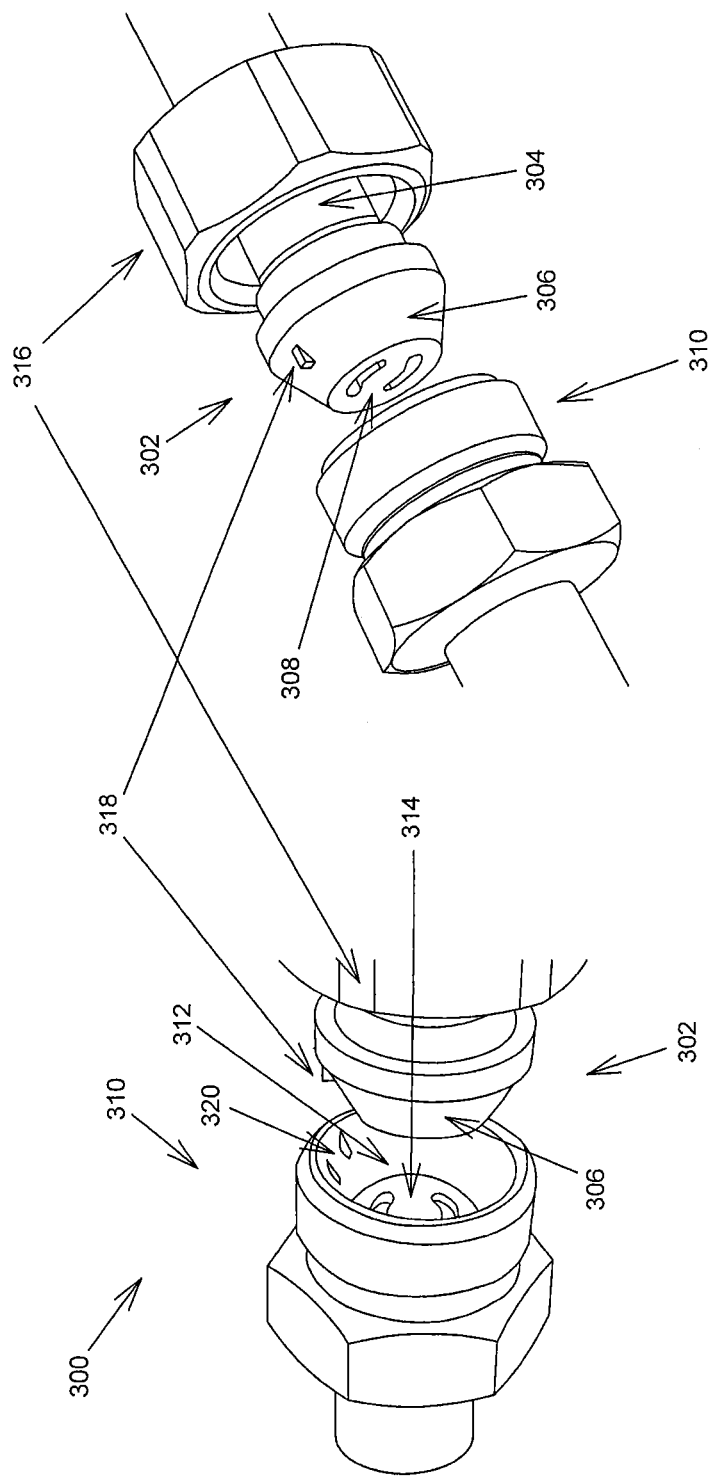
FIG. 3 provides two perspective views of a flow controller in accordance with some embodiments of the present disclosure.
Figure 4:
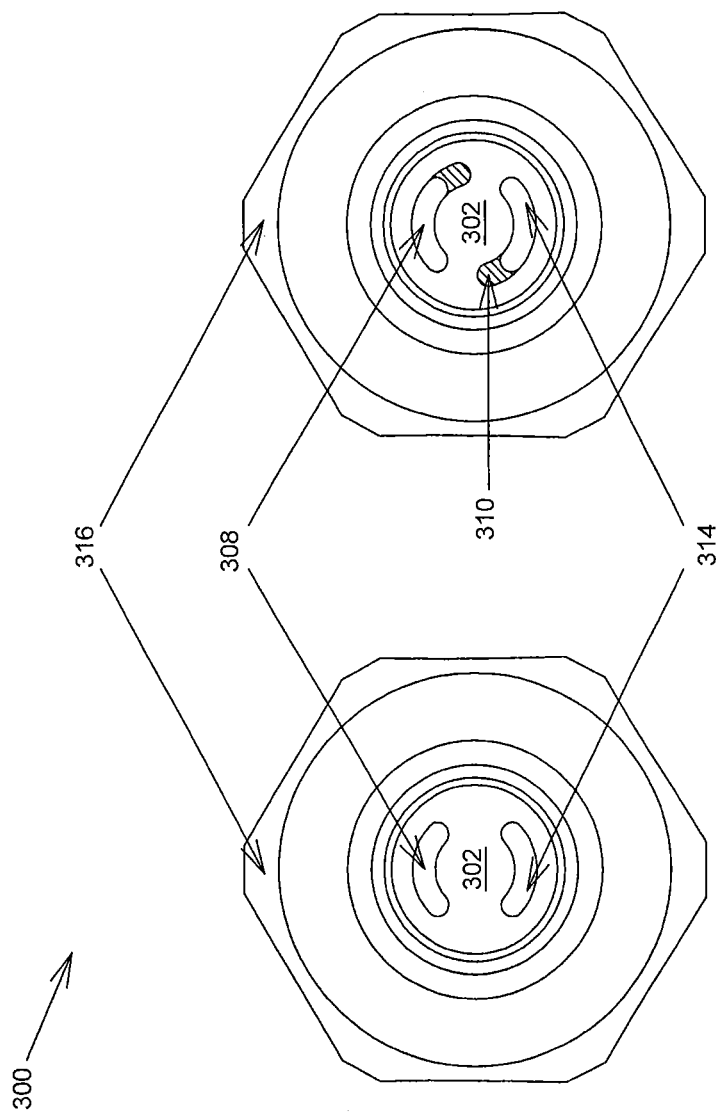
FIG. 4 provides two cross-section views of the flow controller of FIG. 3 in accordance with some embodiments of the present disclosure.
Figure 5:
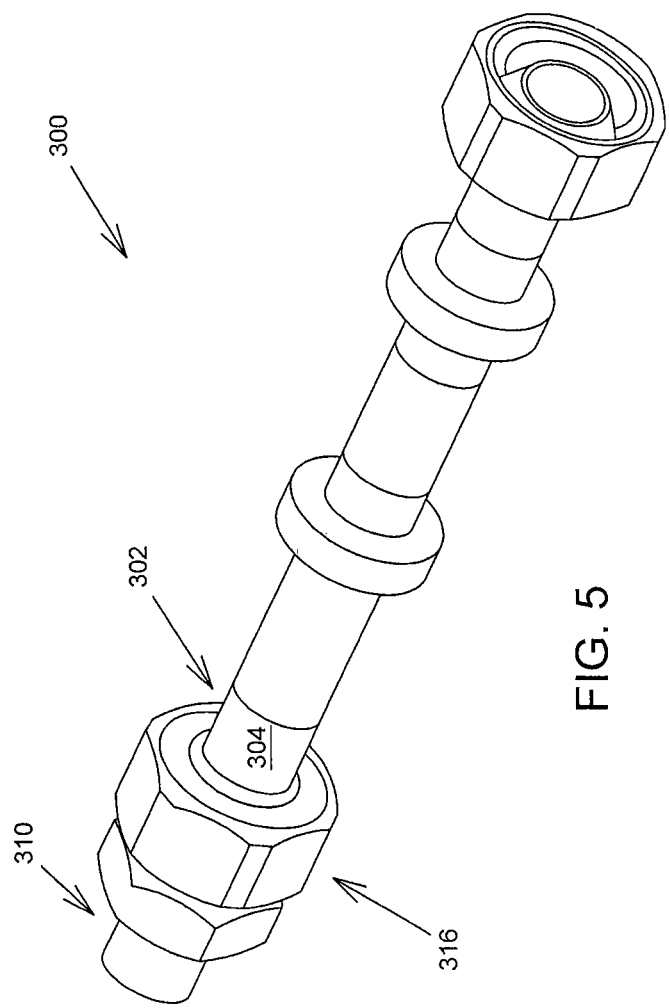
FIG. 5 illustrates a perspective view of the assembled flow controller of FIG. 3 in accordance with some embodiments of the present disclosure.

In accordance with some embodiments of present disclosure, a variable orifice flow controller 300 is provided, which may be flow controller 134 as described above. One embodiment of the flow controller 300 is illustrated in FIG. 3 to FIG. 5. FIG. 3 illustrates two perspective views of a disassembled flow controller 300. The flow controller 300 comprises an upstream connector 302, a downstream connector 310, and an interconnector 316.

The upstream connector 302 may have a cylindrical tubular portion which defines a conduit 304 that is in fluid communication with a bypass flow path designed to receive a fluid flowing through the bypass flow path. Other geometric configurations may be suitable for the conduit 304. The upstream connector 302 may further comprise frusto-conical portion 306 which defines a plurality of conduits 308. The plurality of conduits are in fluid communication with conduit 304.

The downstream connector 310 may define a frusto-conical cavity 312 configure to receive the frusto-conical portion 306 of the upstream connector 302. The downstream connector 310 may further define a plurality of conduits 314 in fluid communication with the cavity 312. Additionally, the conduits 314 are in fluid communication with the reformate exhaust conduit and the anode inlet.

The plurality of conduits 308 and 314 may each be opposing, arcuate conduits, although other geometric designs may be used, and each conduit 308 may form an opposing pair with a conduit 314.

The interconnector 316 may be a connection fitting designed to provide a fluid-tight connection after the frusto-conical portion 306 is received within the frusto-conical cavity 312. The interconnector 316 may comprise a plurality of internal threads (not shown) which engage a plurality of threads (not shown) on the downstream connector 310. By tightening the interconnector 316 onto the downstream connector, the fluid-tight connection may be achieved. The fluid-tight connection may be gastight, wherein the gas refers to the gas flowing through flow controller 300 or the gas surrounding the flow controller 300, such as, e.g., the atmosphere, or may refer to liquids. The interconnector 316 may be a hose nut.

The amount of fluid communication between the plurality of conduits 308 and 314, which may be considered the same as the flow rate through the bypass line, may be selected by the radial alignment between the upstream and downstream connectors 302 and 310, respectively. As shown in FIG. 4, the conduits 308 and 314 may be aligned to provide the maximum flow rate achievable for a give flow controller 300 design, or the conduits 308 and 314 may be intentionally misaligned in order to reduce the effective flow area of the flow controller 300, thereby reducing the overall flow rate of the fluid in the bypass conduit.

The flow controller 300 may further comprise an alignment tab 318 affixed to the upstream connector 302 and a plurality of alignment notches 320 on the downstream connector 310. The alignment tab 318 and notches 320 function together to prevent the rotation of the upstream connector 302 around its long axis relative to the downstream connector 310, thereby maintaining the desired alignment and, therefore, flow rate. In some embodiments the alignment of the conduits 308 and 314 is maintained by compression fit rather than by use of the alignment tab 318 and notches 320.

A perspective view of the assembled flow controller 300 is shown in FIG. 5.

The flow controller 300 illustrated in FIGS. 3-5 is designed for applications in which other designs would fail due to the high temperature, high pressure, or both high temperature and pressure of those applications. These high temperatures may be caused by the recycled anode exhaust which may be supplied to the fuel cell system reforming unit. Additional heat may be provided by a cathode exhaust gas (or other high temperature gas) heat exchanger which may be located upstream of the flow controller 300. For example, flow controller 300 may be able to maintain a fluid-tight connection at temperatures of at least 650 degrees Celsius, 700 degrees Celsius, 800 degrees Celsius, 850 degrees Celsius, 900 degrees Celsius, or 950 degrees Celsius.

Figure 6:
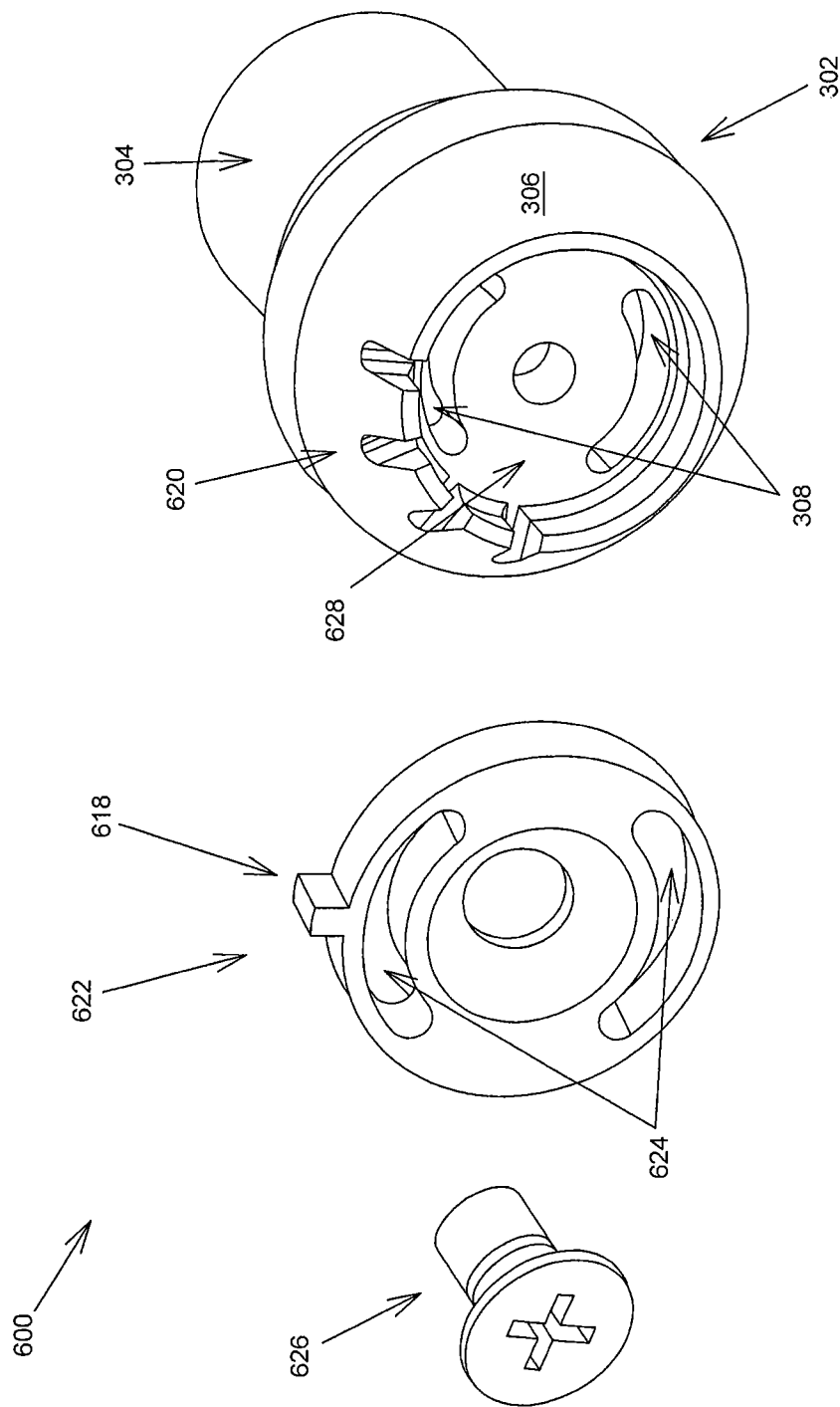
FIG. 6 illustrates a disassembled, perspective view of a flow controller in accordance with some embodiments of the present disclosure.
Figure 7:
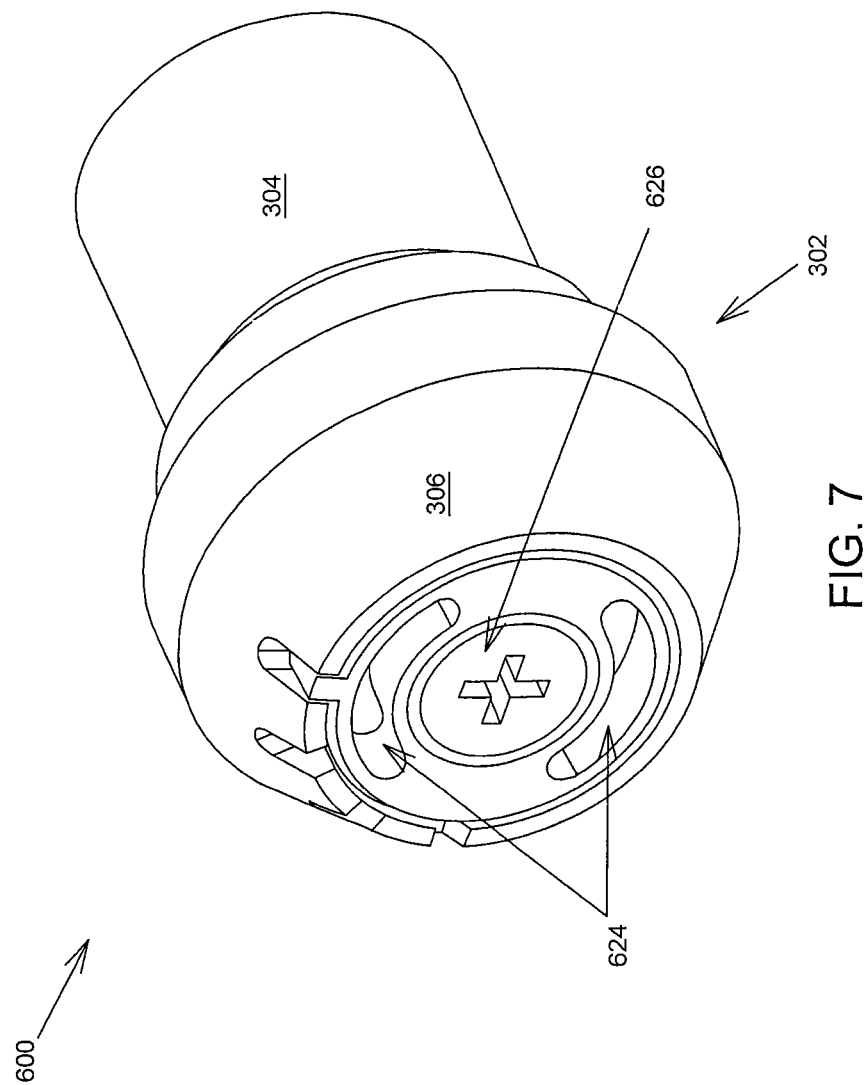
FIG. 7 illustrates an assembled, perspective view of the flow controller of FIG. 6 in accordance with some embodiments of the present disclosure.

A flow controller 600 in accordance with some embodiments of the present disclosure is illustrated in FIG. 6 and FIG. 7. FIG. 6 illustrates the exploded, unassembled perspective view of the controller 600. An assembled, perspective view of controller 600 may be seen in FIG. 7. This flow controller may function in a manner similar to the controller 300 as described, and may contain components performing like functions. In the embodiment illustrated in FIG. 6 and FIG. 7, the downstream connector (not shown) may, or may not, define a plurality of conduits. The flow controller 600 may comprise a disc 622 that defines a plurality of conduits 624. In accordance with some embodiments, the alignment of the plurality of conduits 308 and 624 will determine the amount of fluid communication in bypass line. An alignment tab 618 may be affixed to the disc 622 and may be aligned with one of a plurality of notches 620 on the upstream connector 302. When the upstream and downstream connectors are in a fluid-tight connection, the alignment tab 618 and open of the plurality of notches 620 operate to prevent rotation of the disc 622 relative to the upstream connector, and, therefore, maintain the amount of fluid communication between the plurality of conduits 308 and 624. The flow controller 600 may further comprise a retaining element 626, such as, e.g., a screw, which retains the disc 622 adjacent to a face 628 of the frusto-conical portion 306 of the upstream connector 302.

The flow controller 600 illustrated in FIGS. 6-7 is designed for applications in which other designs would fail due to the high temperature, high pressure, or both high temperature and pressure of those applications. These high temperatures may be caused by the recycled anode exhaust which may be supplied to the fuel cell system reforming unit. Additional heat may be provided by a cathode exhaust gas (or other high temperature gas) heat exchanger which may be located upstream of the flow controller 300. For example, flow controller 600 may be able to maintain a fluid-tight connection at temperatures of at least 650 degrees Celsius, 700 degrees Celsius, 800 degrees Celsius, 850 degrees Celsius, 900 degrees Celsius, or 950 degrees Celsius.

Figure 8:
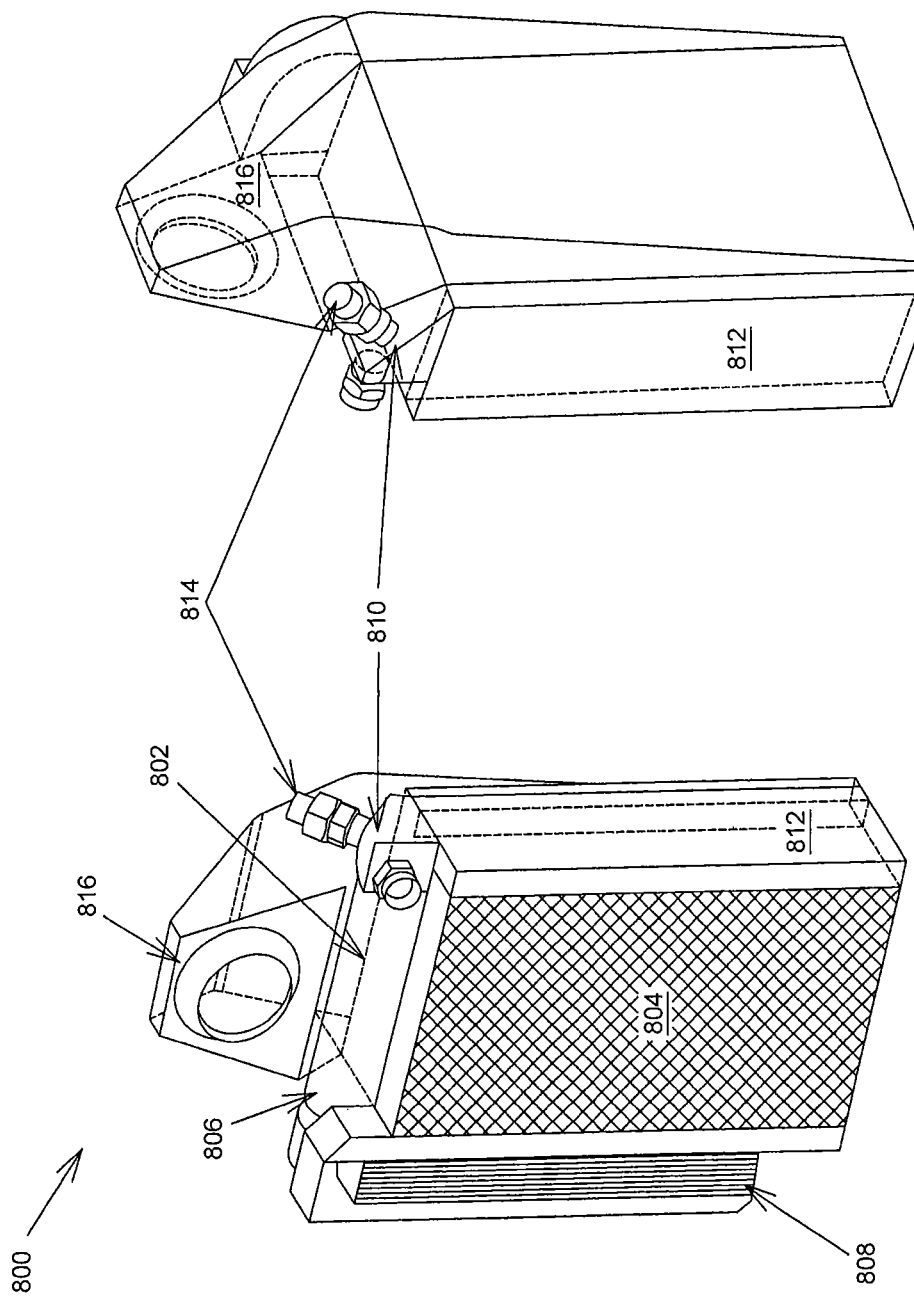
FIG. 8 illustrates two perspective views of a reformer unit having a bypass plenum in accordance with some embodiments of the present disclosure.
Figure 9:
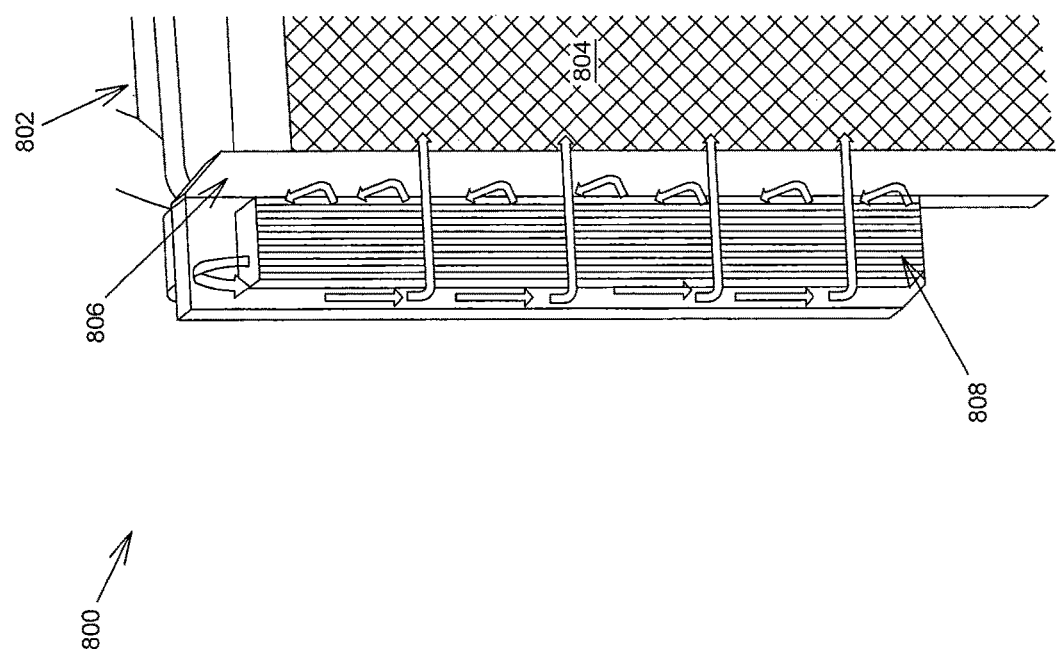
FIG. 9 illustrates the inlet plenum of a reformer unit having a bypass plenum in accordance with some embodiments of the present disclosure.
Figure 10:
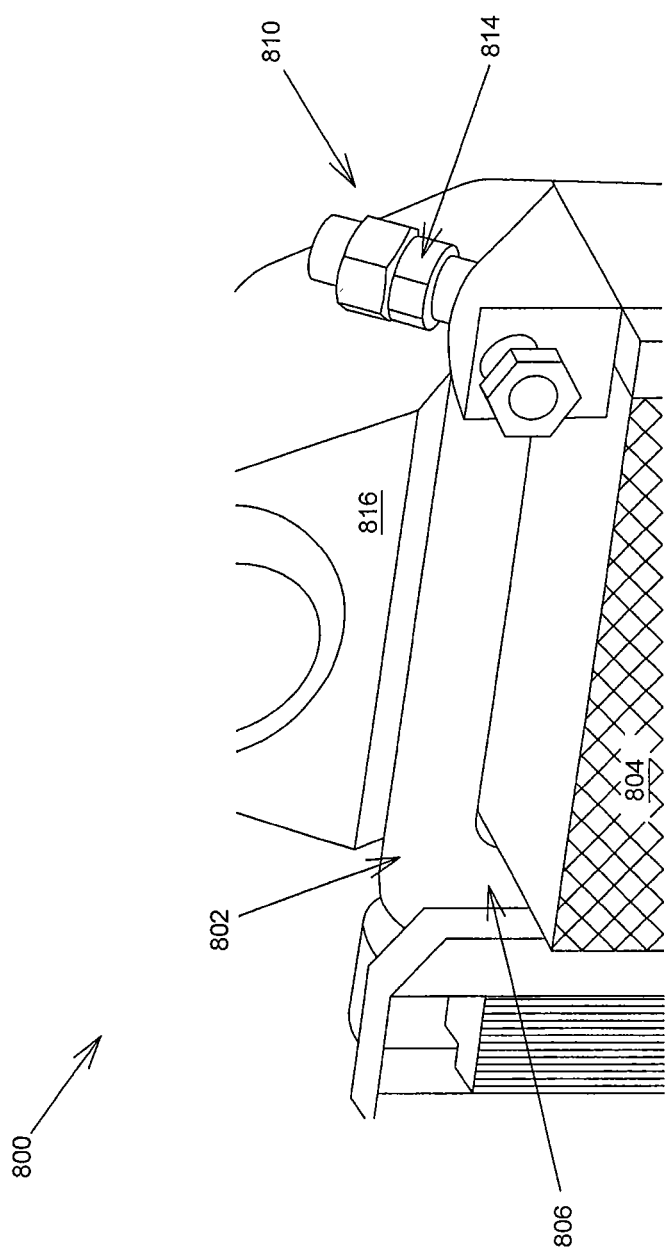
FIG. 10 illustrates a close-up view of a bypass plenum in accordance with some embodiments of the present disclosure.
Figure 11:
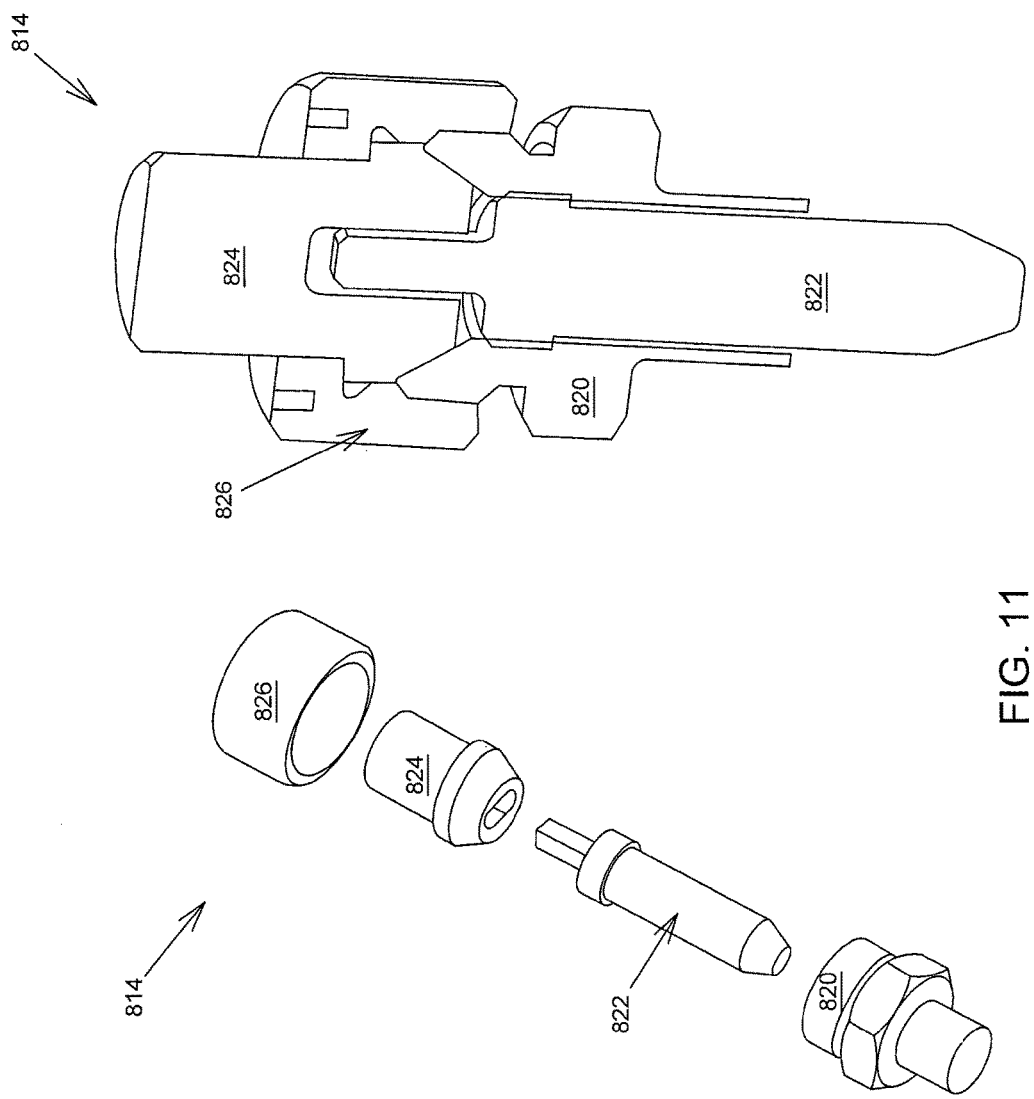
FIG. 11 illustrates exploded perspective and assembled cross-sectional views of a flow restrictor in accordance with some embodiments of the present disclosure.

In accordance with some embodiments of the present disclosure, a reformer unit 800 having a bypass plenum is illustrated in FIGS. 8-12. FIG. 8 illustrates two perspective view of the reformer unit 800. FIG. 9 is a close-up of the reforming section inlet 808. FIG. 10 is a close-up view of the bypass plenum 802. FIG. 11 illustrate a flow restrictor. FIG. 12 illustrates two perspective views, one being a cross section of the other, of the reforming section outlet plenum 812 and the bypass plenum 802 outlet 810.

The reformer unit 800 may comprise a reforming section 804 and a heat exchanging section 816 which may be the cold-side channels and hot-side channels, respectively, as described above. The reformer unit 800 may further comprise a bypass plenum 802 having an inlet 806, an outlet 810, and a flow restrictor 814. The inlet 806 may be in fluid communication with the reforming section inlet 808 and be configured to receive a portion of the unreformed hydrocarbon fuel-anode exhaust mixture flowing thereto. The outlet 810 is in fluid communication with the reforming section outlet plenum 812 such that the bypass plenum 802 and reforming section 804 flow paths may converge and mix prior to being supplied to the anode. The flow restrictor 814 may be disposed in a flow path between the outlet 810 of the bypass plenum 802 and the outlet plenum 812 of the reforming section 804.

The heat exchanging section 816 of the reformer unit 800 may be configured to be in thermal communication with the bypass plenum 802. For example, the bypass plenum may share or have one or more walls in contact with the heat exchange section 816. This will effect a heat exchange between the cathode exhaust, or other hot fluid, flowing through the heat exchanging section 816 to provide thermal energy to the bypass flow prior to that flow being merged with the reformed fuel from the reforming section 804. In some embodiments, the flow of cathode exhaust or other hot fluid in the heat exchange section 816 may be configured to exchange heat with the fluid in the bypass plenum 802 prior to exchanging heat with fluid in the reforming section 804. In other embodiments, the flow of cathode exhaust or other hot fluid in the heat exchange section 816 may be configured to exchange heat with the fluid in the reforming section 804 prior to exchanging heat with fluid in the bypass plenum 802. The first occurring heat transfer may also be referred to as an upstream thermal communication. Whether the heat exchange between the fluid in the heat exchange section 816 occurs first with the bypass plenum 802 or the reforming section 804 may be controlled by, e.g., selecting the direction of flow of the cathode exhaust or other hot fluid.

As shown in FIG. 12, the outlet 810 of the bypass plenum 802 may define an orifice 818 providing fluid communication between the bypass plenum 802 and the outlet plenum 812 of the reforming section 804. The flow restrictor 814 may comprise an elongated member 822 (also referred to as a flow restricting member or an elongated flow restricting member) which extends into the orifice to reduce its cross-sectional area and restrict the fluid flowing there through.

Alternate views of the flow restrictor 814 are provided in FIG. 11. The flow restrictor 814 may comprise a connector 820 and the flow restricting member 822. The connector 820 may be mounted to the reformer unit 800 on a wall of the bypass plenum 802.

The flow restricting member 822 may be elongated and removably carried by the connector 820. The member 822 extends through the orifice 818, thereby reducing its effective cross-sectional area. The flow rate of the fluid flowing between the bypass plenum 802 and the outlet plenum 812 of the reforming section 804 is selected by sizing the flow restricting member 822 relative to the orifice 818. The flow restricting member 822 may be cylindrical. In some embodiments the flow restricting member 822 may have an oval or rectangular cross-section or may be conical or other suitable shape. The elongated member 822 may have a threaded portion (not shown) for engaging the connector 820.

In some embodiments, the flow restricting member 822 may have a tapered cross-section. The flow rate between the bypass plenum 802 and the outlet plenum, 812 may be determined by the sizing of the member 822 and the orifice 818 and by the axial alignment between the two parts. This axial alignment may be set by rotating a threadably engaged member 822 within a threaded (not shown) connector 820.

The connector 820 may have a first portion defining a cylindrical cavity having a threaded portion for engaging the elongated member 822, and may further have a second portion which may define a frusto-cylindrical cavity in communication with the cylindrical cavity. This cavity may accept a fitting 824 having a frusto-cylindrical portion defining an axial slot. The elongated member 822 may further comprise a portion which extends into this axial slot, thereby preventing rotation of the elongated member 822 while the fitting is installed. In some embodiments, rotation of the elongated member may be prevented when the nut 826 operably engages connector 820 to provide a fluid-tight seal.

The flow restrictor 814 may further comprise an internally threaded sealing nut 826 which may engage external threading on the connector 820, thereby providing a fluid-tight seal between the fitting 824 and the connector 820 when nut 826 is tightened on connector 820. Additionally, fitting 824 may be engaged by the nut 826 to prevent leakage of system fluid around member 822.

The flow restrictor 814 illustrated in FIGS. 8 and 10-12 is designed for applications in which other designs would fail due to the high temperature and pressure of those applications. These high temperatures may be caused by the recycled anode exhaust which may be supplied to the fuel cell system reforming unit. Additional heat may be provided by a cathode exhaust gas (or other high temperature gas) heat exchanging section 816. For example, flow restrictor 814 may be able to maintain a fluid-tight connection at temperatures of at least 650 degrees Celsius, 700 degrees Celsius, 800 degrees Celsius, 850 degrees Celsius, 900 degrees Celsius, or 950 degrees Celsius.

While preferred embodiments of the present subject matter have been described, it is to be understood that the embodiments described are illustrative only and that the scope of the subject matter is to be defined solely by the appended claims when accorded a full range of equivalence, and the many variations and modifications naturally occurring to those of skill in the art from a perusal hereof.

We claim:

1. A reformer unit for a fuel cell system comprising:
a reforming section configured to reform a hydrocarbon-containing fuel, said reforming section having an inlet adapted for fluid communication with a source of hydrocarbon-containing fuel, and an outlet adapted for fluid communication with an anode inlet of a fuel cell stack;
a heat exchanging section configured to heat a fluid flowing in the reforming section, said heat exchanging section having an inlet adapted for fluid communication with an exhaust of a cathode of a fuel cell stack, and an outlet adapted for fluid communication with an inlet of a cathode of the fuel cell stack, said heat exchanging section being in thermal communication with said reforming section to effect heat transfer between a fluid flowing through said heat exchanger section and a fluid flowing through said reforming section; and
a bypass section configured to provide a bypassing flowpath for a hydrocarbon-containing fuel around said reforming section, said bypass section having an inlet in fluid communication with said reforming section inlet, an outlet in fluid communication with said reforming section outlet, and a variable orifice flow controller positioned in the bypassing flowpath,
wherein said variable orifice flow controller comprises:
an upstream connector having a cylindrical tubular portion defining a conduit in fluid communication with the bypassing flowpath for receiving fluid flowing within the flowpath, and a frusto-conical portion defining a plurality of conduits in fluid communication with the conduit defined by said cylindrical tubular portion;
a downstream connector defining a frusto-conical cavity for receiving the frusto-conical portion of said upstream connector in a selected radial alignment, said downstream connector further defining a plurality of conduits in fluid communication with said cavity; and
an interconnector for providing a fluid-tight connection when said frusto-conical portion of said upstream connector is received within the cavity defined by said downstream connector,
wherein an amount of fluid communication between the plurality of conduits defined by said downstream connector and the plurality of conduits defined by the frusto-conical portion of said upstream connector is selected by the radial alignment therebetween when in a fluid-tight connection.

2. The reformer unit of claim 1 wherein said heat exchanging section is in thermal communication with said bypass section to effect heat transfer between a fluid flowing through said heat exchanger section and a fluid flowing through said bypass section.

3. The reformer unit of claim 1 wherein each of the frusto-conical portion of said upstream connector and said downstream connector define a pair of opposing arcuate conduits.

4. The reformer unit of claim 1 wherein said variable orifice flow controller further comprises:
a disc defining the plurality of conduits, said disc being adjacent to a face of the frusto-conical portion of said upstream connector in the selected radial alignment so that the plurality of conduits defined by said disc are in fluid communication with the plurality of conduits defined by the frusto-conical portion of said upstream connector and the conduit defined by said downstream connector.

5. The reformer unit of claim 4 wherein each of the frusto-conical portion of said upstream connector and said disc define a pair of opposing arcuate conduits.

6. The reformer unit of claim 1, wherein said reforming unit is a steam reformer.

7. The reformer unit of claim 1, wherein said reforming section comprises a Group VIII metal.

8. The reforming unit of claim 7, wherein said reforming section further comprises an element selected from the group comprising Groups IIa-VIIa, Groups Ib-Vb, lanthanide and actinide series elements.

9. The reforming unit of claim 1 further comprising a second heat exchanging section having an inlet adapted for fluid communication with an exhaust of the fuel cell system and an outlet adapted for fluid communication with an inlet of the fuel cell system, said second heat exchanging section being in thermal communication with said bypass section to effect heat transfer between a fluid flowing through said heat exchanger section and a fluid flowing through said bypass section.

10. The reforming unit of claim 1, wherein said bypass section comprises a ceramic coating.

11. A variable orifice flow controller for controlling the flow of a high temperature fluid, said controller comprising:
an upstream connector having a cylindrical tubular portion defining a conduit in fluid communication with a bypassing flowpath, and a frusto-conical portion defining a plurality of conduits in fluid communication with the conduit defined by said cylindrical tubular portion;
a downstream connector defining a frusto-conical cavity for receiving the frusto-conical portion of said upstream connector in a selected radial alignment, said downstream connector further defining a plurality of conduits in fluid communication with said cavity; and
an interconnector for providing a fluid-tight connection when said frusto-conical portion of said upstream connector is received within the cavity defined by said downstream connector,
wherein an amount of fluid communication between the plurality of conduits defined by said downstream connector and the plurality of conduits defined by the frusto-conical portion of said upstream connector is selected by the radial alignment therebetween when in a fluid-tight connection,
wherein the controller is positioned in the bypass section of a reformer system, the reformer system comprising a reforming section, a heat exchanging section configured to heat a fluid flowing in the reforming section, and the bypass section configured to provide the bypassing flowpath around said reforming section.

12. The flow controller of claim 11 wherein each of the frusto-conical portion of said upstream connector and said downstream connector define a pair of opposing arcuate conduits.

13. The flow controller of claim 11 forming a fluid-tight connection for a fluid having a temperature of at least 650 degrees Celsius.

14. The flow controller of claim 11, wherein said downstream connector comprises one or more notches adapted to operably receive a tab affixed to said upstream connector, said one or more notches and tab configured to prevent relative rotation between said upstream and downstream connectors.

15. The flow controller of claim 11, wherein the radial alignment between the plurality of conduits defined by said downstream connector and the plurality of conduits defined by the frusto-conical portion of said upstream connector is maintained by a compression fit between said upstream and downstream connectors when in a fluid-tight connection.

16. A variable orifice flow controller for controlling the flow of a high temperature gas, said controller comprising:
an upstream connector having a cylindrical tubular portion defining a conduit in fluid communication with a bypassing flowpath, and a frusto-conical portion defining a plurality of conduits in fluid communication with the conduit defined by said cylindrical tubular portion;
a downstream connector defining a frusto-conical cavity for receiving the frusto-conical portion of said upstream connector, said downstream connector further defining a conduit in fluid communication with said cavity;
a disc defining a plurality of conduits, said disc being adjacent to a face of the frusto-conical portion of said upstream connector in a selected radial alignment so that the plurality of conduits defined by said disc are in fluid communication with the plurality of conduits defined by the frusto-conical portion of said upstream connector and the conduit defined by said downstream connector; and
an interconnector for providing a gastight connection when said frusto-conical portion of said upstream connector is received within the cavity defined by said downstream connector,
wherein an amount of fluid communication between the plurality of conduits defined by said disc and the plurality of conduits defined by the frusto-conical portion of said upstream connector is selected by the radial alignment therebetween when in a gastight connection,
wherein the controller is positioned in the bypass section of a reformer system, the reformer system comprising a reforming section, a heat exchanging section configured to heat a fluid flowing in the reforming section, and the bypass section configured to provide the bypassing flowpath around said reforming section.

17. The flow controller of claim 16 wherein each of the frusto-conical portion of said upstream connector and said disc define a pair of opposing arcuate conduits.

18. The flow controller of claim 16 forming a gastight connection for a gaseous fluid having a temperature of at least 650 degrees Celsius.

19. The flow controller of claim 16, wherein said upstream connector comprises one or more notches adapted to operably receive a tab affixed to said disc, said one or more notches and tab configured to prevent relative rotation between said upstream connector and said disc.

* * * * *